United States Patent
Simmons et al.

(10) Patent No.: US 7,860,195 B2
(45) Date of Patent: *Dec. 28, 2010

(54) CORRECTION CIRCUIT FOR IMPROVING PERFORMANCE IN A CHANNEL DECODER

(75) Inventors: Sean Simmons, Waterloo (CA); Huan Wu, Kanata (CA); Zoltan Kemenczy, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/537,042

(22) Filed: Aug. 6, 2009

(65) Prior Publication Data

US 2010/0005353 A1  Jan. 7, 2010

Related U.S. Application Data

(63) Continuation of application No. 11/311,178, filed on Dec. 20, 2005, now Pat. No. 7,590,197.

(51) Int. Cl.
*H04L 27/06* (2006.01)
(52) U.S. Cl. ...................................... 375/341
(58) Field of Classification Search ................ 375/229, 375/232, 262, 265, 341; 714/794–796
See application file for complete search history.

(56) References Cited

U.S. PATENT DOCUMENTS

| 5,621,764 | A | 4/1997 | Ushirokawa et al. |
|---|---|---|---|
| 5,844,946 | A | 12/1998 | Nagayasu |
| 6,269,124 | B1 | 7/2001 | Nagayasu et al. |
| 6,625,778 | B1 | 9/2003 | Nakamura et al. |
| 7,221,720 | B2 | 5/2007 | Robinson |
| 7,313,750 | B1 | 12/2007 | Feng et al. |
| 2002/0159546 | A1 | 10/2002 | Fulghum et al. |
| 2004/0240595 | A1 | 12/2004 | Raphaeli |
| 2005/0018794 | A1 | 1/2005 | Tang et al. |
| 2006/0029166 | A1 | 2/2006 | Kang |

FOREIGN PATENT DOCUMENTS

| EP | 0956113 A | 12/1999 |
|---|---|---|
| WO | 2004010665 A | 1/2004 |

OTHER PUBLICATIONS

Papke, L., et al. "Improved Decoding with the SOVA in a Parallel Concatenated (Turbo-code) Scheme", IEEE, 1996, pp. 102-106.

*Primary Examiner*—Khanh C Tran
(74) *Attorney, Agent, or Firm*—Perry + Currier Inc.

(57) ABSTRACT

A receiver for a mobile communication system includes a channel equalizer for receiving a burst and generating a soft decision output associated with the burst, a soft decision correction circuit follows the channel equalizer and a decoder receives and decodes a block of bursts. The soft decision correction circuit calculates a correction factor based on the soft decision output for the burst and applies the correction factor to the burst prior to the burst entering the decoder.

18 Claims, 6 Drawing Sheets

CORRECTION CIRCUIT FOR IMPROVING PERFORMANCE IN A CHANNEL DECODER

CROSS-REFERENCE TO RELATED APPLICATION

This is a continuation of U.S. patent application Ser. No. 11/311,178, filed Dec. 20, 2005.

FIELD

The present specification relates to a mobile communication system, in particular to a correction circuit for improving performance in a channel decoder of a receiver.

BACKGROUND

GSM (Global Systems for Mobile Communications) is the dominant world standard for 2G/2.5G wireless voice and data communications. EDGE (Enhanced Data rates for GSM Evolution) is a 3G technology that provides increased data transmission speeds of up to 384 kbit/s within the existing GSM spectrum. EDGE is an enhancement to GPRS (General Packet Radio Service) and is becoming more widely used because it effectively triples the gross data rate offered by GSM.

A major source of performance degradation in wireless telephony and data terminal products is ambient noise. Since ambient noise tends to vary significantly from environment to environment, reducing or eliminating the noise presents a challenge.

In a typical GSM communication system, speech and/or data is encoded at the source and transmitted over a network to a receiver. Upon receipt of the transmitted data, the receiver performs channel equalization and decoding steps to return the speech and/or data to a recognizable form for delivery to the user.

The channel decoder used in a GSM system is typically a forward error correction (FEC) decoder, which operates on the channel equalization output of four consecutive data transmission bursts. Conventional equalizers, such as the Viterbi equalizer, for example, do not take into account the signal-to-noise ratio (SNR) fluctuations between the data transmission bursts due to the fading nature of the channel. As such, the soft decision (SD) output of the equalizer does not reflect the input SNR. The stripping of SNR information from the SD compromises the performance of the channel decoder that follows and thus the quality of the speech and/or data that is delivered to the user. A true Maximum A posteriori Probability (MAP) equalizer accounts for the SNR, however, this type of equalizer is much more complicated than conventional equalizers. It is therefore desirable to restore the SNR information in the SD of a conventional equalizer to improve the performance of the channel decoder.

BRIEF DESCRIPTION OF THE DRAWINGS

The specification will be better understood with reference to the following Figures in which like numerals denote like parts and in which.

DETAILED DESCRIPTION OF THE PREFERRED EMBODIMENTS

Figure 1:
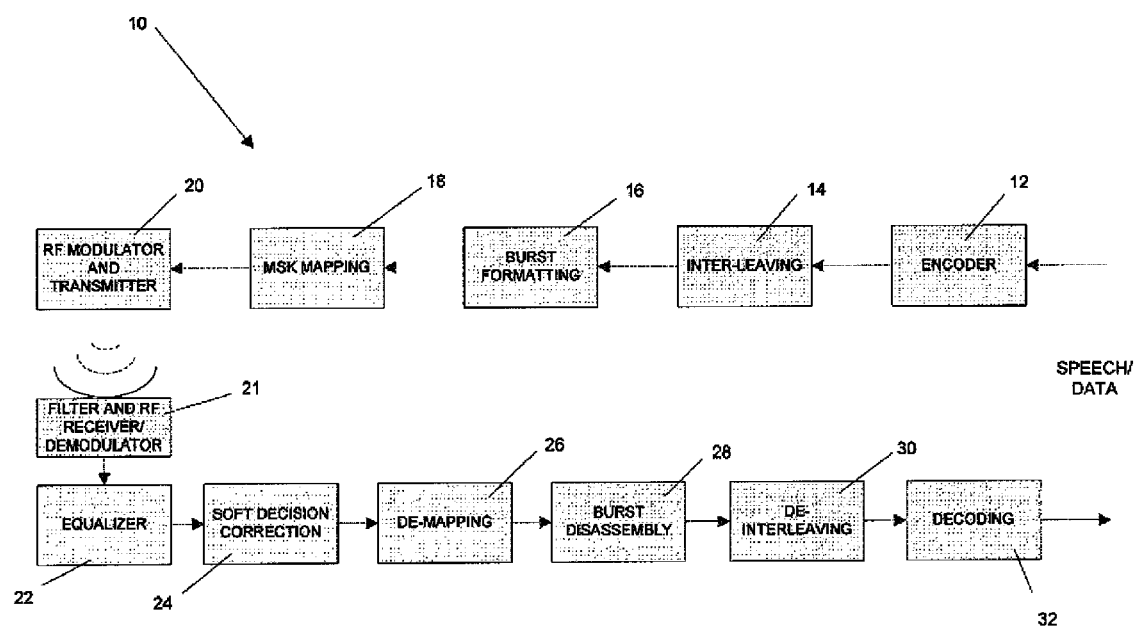
FIG. 1 is a block diagram of a GSM data communication system according to one embodiment.

Referring to FIG. 1, a block diagram is provided of a GSM mobile data communication system 10 according to one embodiment. The mobile data communication system 10 is operable according to GSM or EDGE communication standards.

As shown, speech and/or data passes though an encoder 12 (i.e. parity encoding and convolutional encoding), an interleaving block 14, a burst formatting block 16 and an MSK (Minimum Shift Keying) mapping block 18 prior to transmission of the encoded information to a receiver at RF modulator and transmitter 20. The encoded information is received and passes through a filter and RF receiver/demodulator 21. Channel equalization is then performed burst-by-burst using a Viterbi equalizer 22. The transmitted data bursts then pass through a correction circuit 24, a demapping block 26, a burst disassembling block 28, a de-interleaving block 30 and a decoding block 32 prior to being delivered to the user as speech and/or data.

Figure 2:
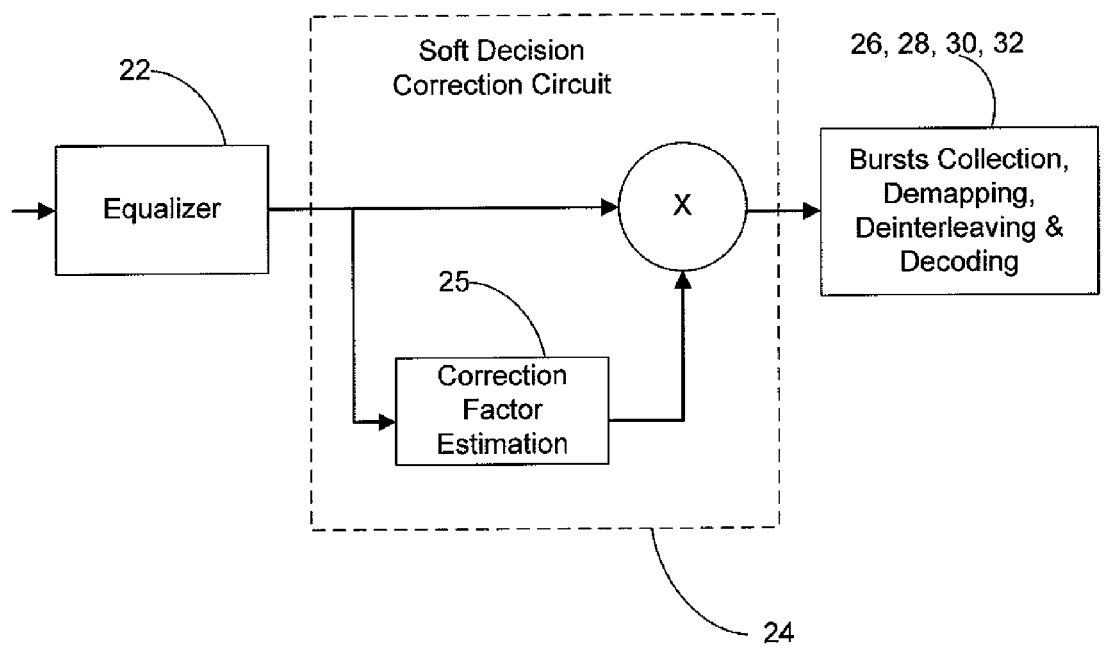
FIG. 2 is block diagram of a correction circuit for improving performance of a channel decoder in the GSM system of FIG. 1, according to a first embodiment.

Referring also to FIG. 2, the correction circuit 24 estimates a correction factor within correction factor estimation block 25 for each transmission burst based on the soft decision output of the Viterbi equalizer 22. The correction factor is then applied to the burst prior to the burst passing through the subsequent demapping, burst disassembly, de-interleaving and decoding blocks 26, 28, 30, 32, respectively.

Figure 3:
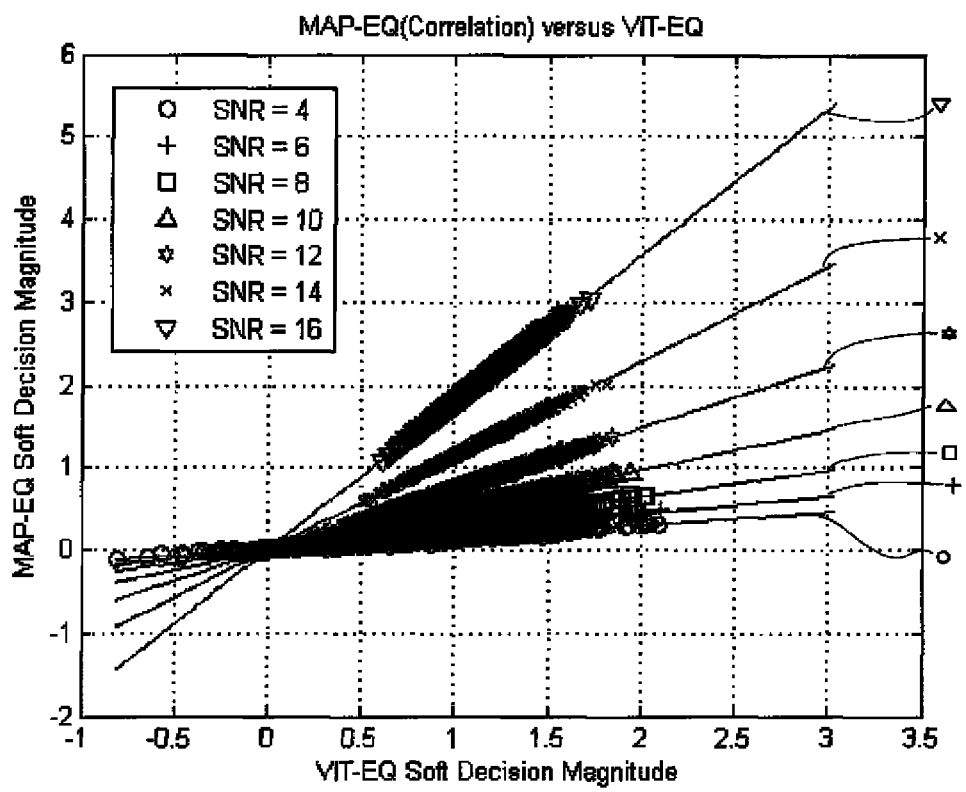
FIG. 3 is a graph comparing soft decision output from a MAP equalizer and a Viterbi equalizer.
Figure 4:
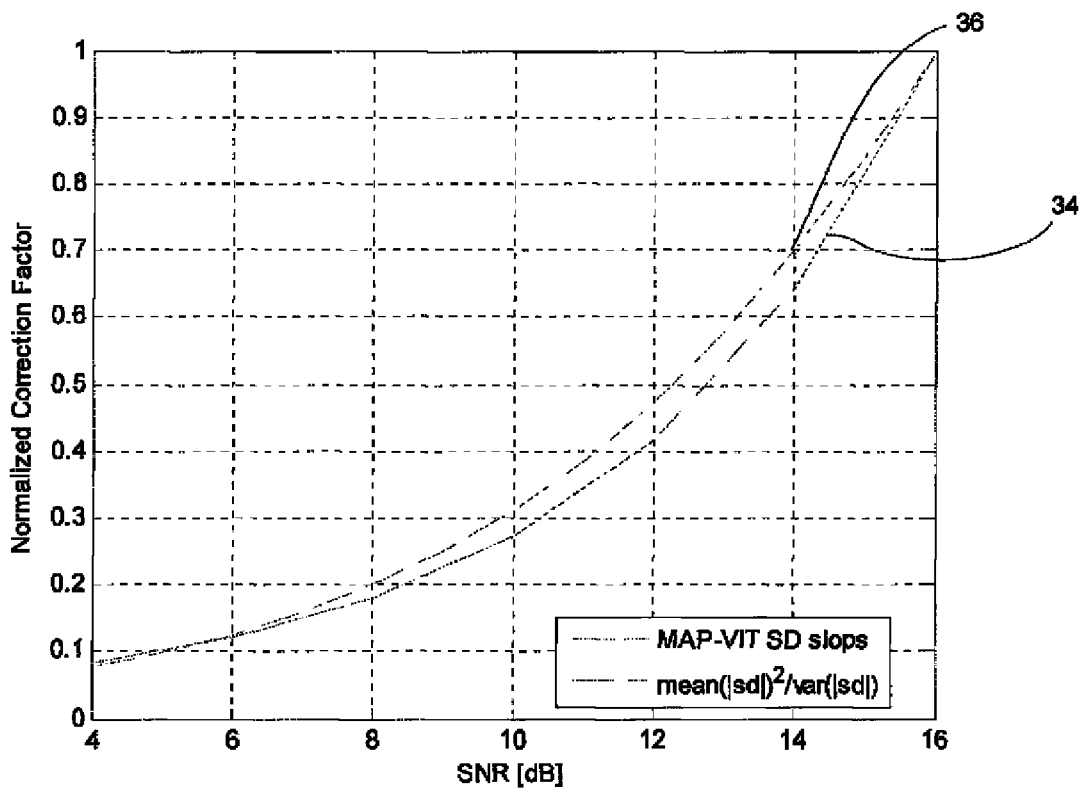
FIG. 4 is a graph showing correction factor versus SNR.

The correction factor compensates for the SNR of each burst. A formula for estimating the correction factor is derived from the relationship between the output of a Maximum A posteriori Probability (MAP) equalizer and a Viterbi equalizer. The log-likelihood ratio (LLR) output from a MAP equalizer provides optimal soft decision output because the input SNR information is embedded therein. Referring to FIG. 3, soft decision output from a MAP equalizer is plotted against soft decision output from a Viterbi equalizer for a common set of input samples. The slopes of the lines in FIG. 3 are plotted on curve 34 in FIG. 4 versus the SNRs, which are normalized at SN=16 dB.

The normalization point is implementation-dependent and is selected based on the dynamic range of the SD and the word length used to represent the SD. The optimum normalization point is determined by performing simulations.

An empirical formula of:

$$c = \frac{m_{|sd|}^2}{\sigma_{|sd|}^2},$$

which is the squared mean of the absolute value of the soft decision divided by the variance of the absolute value of the soft decision, is plotted on curve 36. The curve 36 loosely fits the curve 34, as shown. A normalization constant of ⅛, which was optimized for a particular HW/SW platform with 4-bit SD representation, is further applied to the correction factor. This correction factor formula avoids estimation of input SNR for each burst, which results in a more accurate SNR estimation. Further, the correction factor formula avoids the use of a look-up table that converts the SD of the Viterbi equalizer to the LLR of a MAP equalizer.

Referring back to FIG. 1, the type of filter used in block 21 and the type of metrics used in the Viterbi equalizer differ depending on whether the receiver is operating in a GSM or an EDGE environment. A GSM receiver includes a matched filter and correlation metrics are used in the Viterbi equalizer because the noise exiting the matched filter is non-white. In an EDGE receiver, a noise-whitening filter is used and Euclidean distance metrics are used in the Viterbi equalizer because the noise is approximately white. The equivalence of these two metrics has been proven in "Unification of MLSE Receivers and Extension of Time-Varying Channels", Gregory E. Bottomly and Sandeep Chennakeshu, IEEE Trans. Comm. Vol. 46, no. 4, 1998. As such, the soft decision correction circuit can be applied to receivers using both GSM and EDGE technology.

Figure 5:
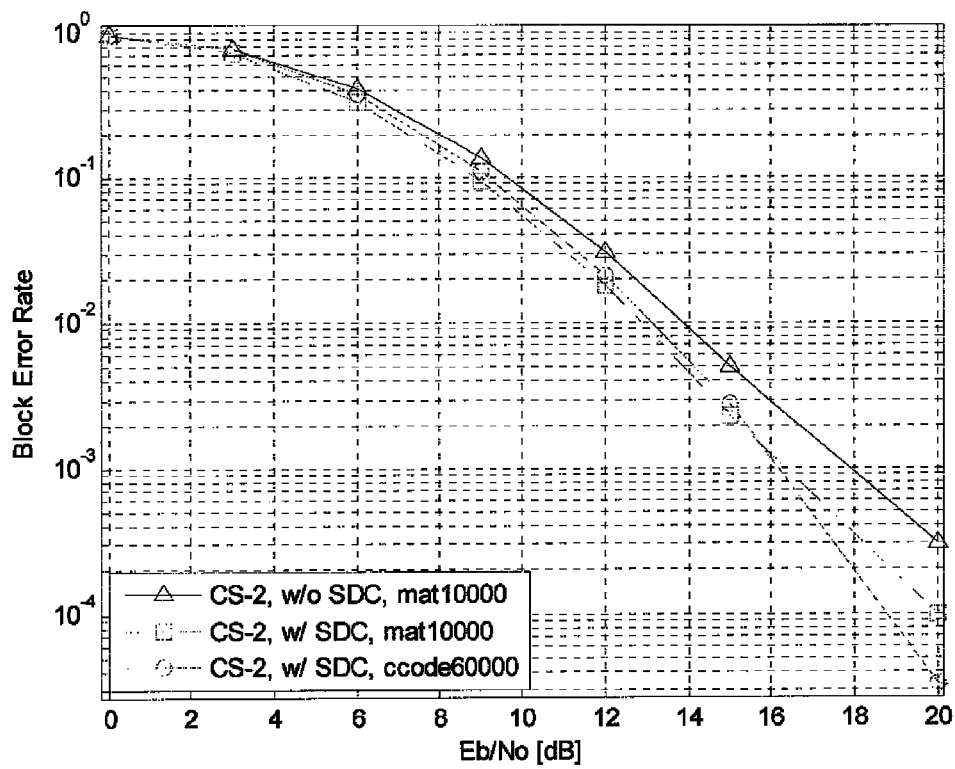
FIG. 5 is a graph comparing BLER with and without a correction factor for a CS-2 coding scheme.
Figure 6:
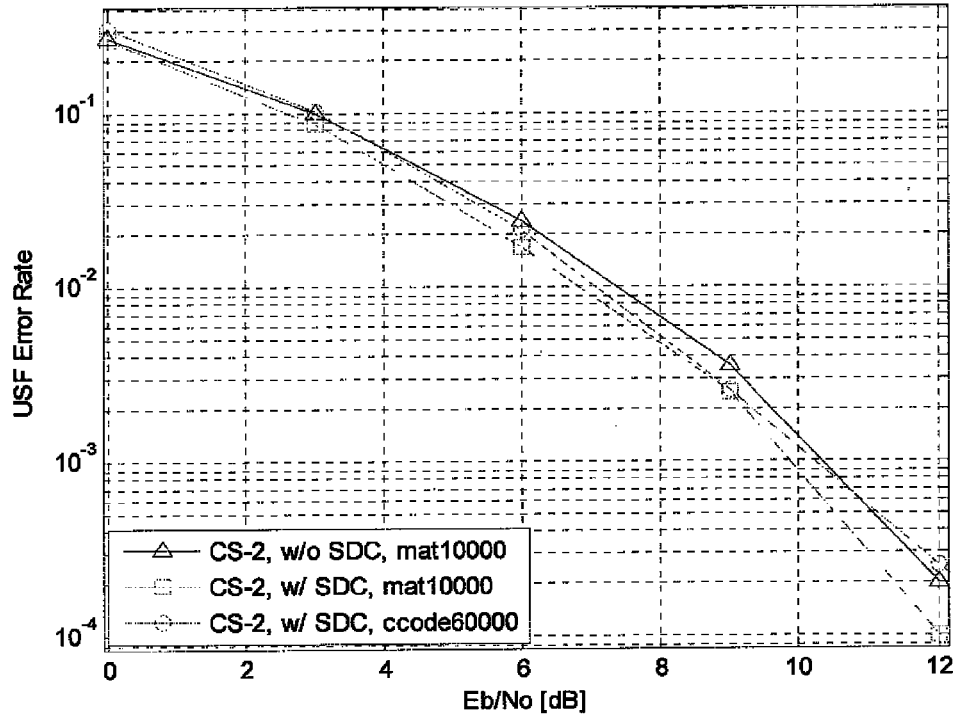
FIG. 6 is a graph comparing USF error rate with and without a correction factor for a CS-2 coding scheme.
Figure 7:
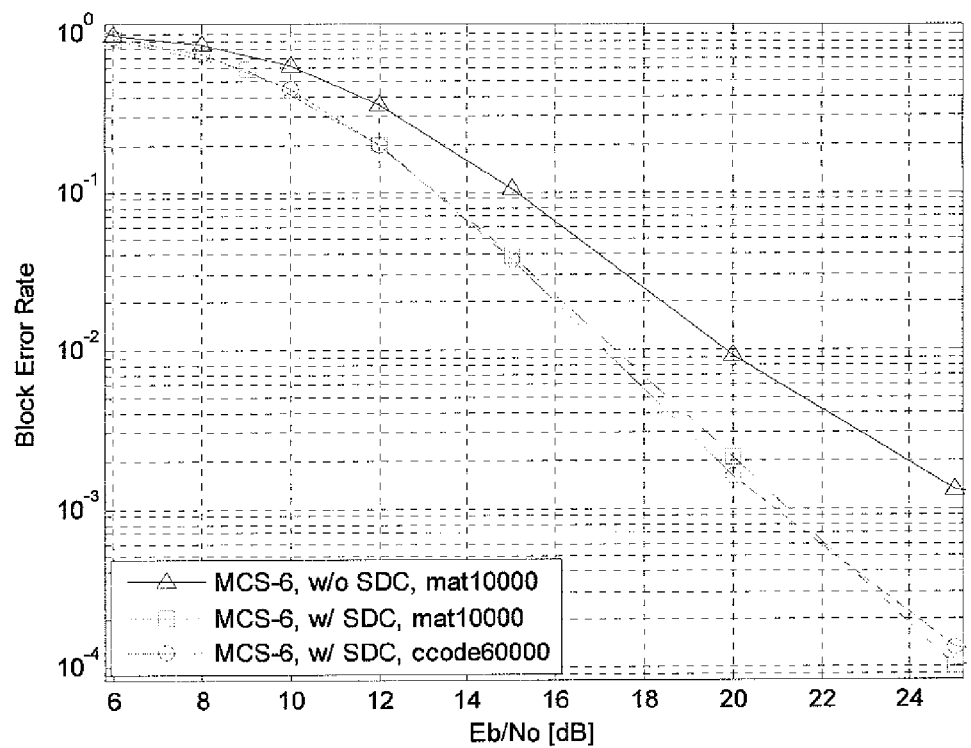
FIG. 7 is a graph comparing BLER with and without a correction factor for a MCS-6 coding scheme.
Figure 8:
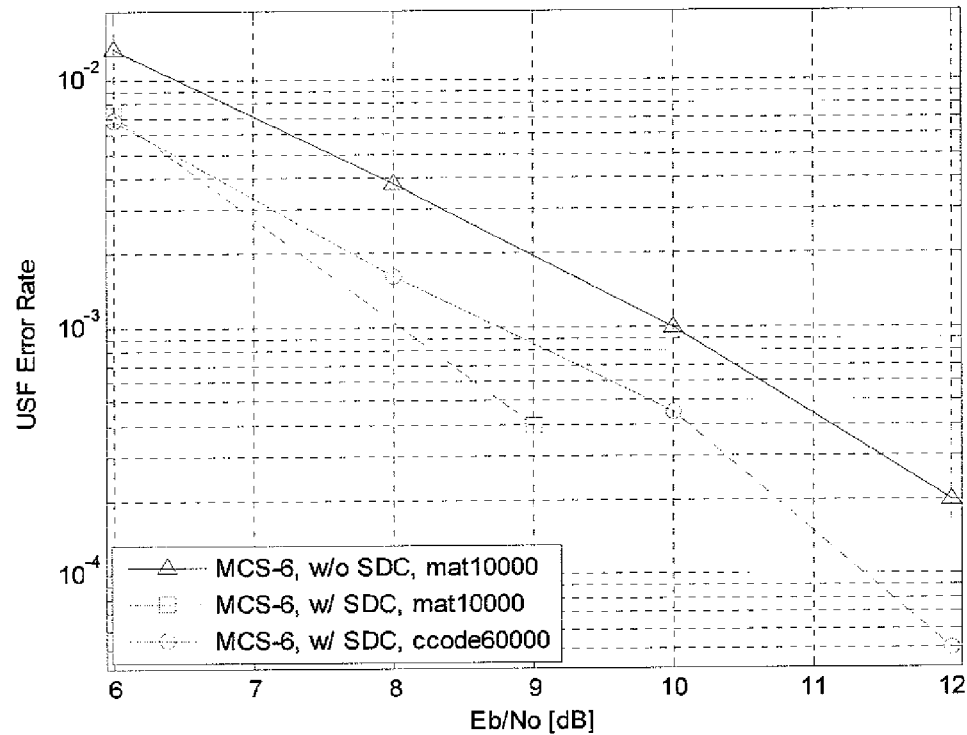
FIG. 8 is a graph comparing USF error rate with and without a correction factor for a MCS-6 coding scheme.

Simulations were performed for a GSM equalizer having a CS-2 coding scheme. The block error rates (BLER) and Uplink State Flag (USF) error rates are shown in FIGS. 5 and 6, respectively. Similarly, simulations were performed for an EDGE equalizer having a MCS-6 coding scheme. The BLER and USF error rates are shown in FIGS. 7 and 8, respectively. A channel profile of TUX6.1-50 km-1950 MHz was used in each of the simulations. As shown, for GSM, the correction factor results in a gain of approximately 0.7 dB at BLER=10⁻². For EDGE, the correction factor results in a gain of approximately 2.7 dB.

In some cases, the transmission of a data block fails. In these cases, Mobile Stations (MS) that support incremental redundancy reception could request at least one retransmission of the data block with a different puncturing scheme. The soft decisions of each subsequent incremental retry pass through the soft decision correction circuit 24 and a correction factor is applied. In some coding schemes, such as MCS-7, for example, soft decisions at some bit positions are overlapped between the retries. When this occurs, the soft decisions from each transmission are added following application of the correction factor and the combined sum is passed to the decoder.

Figure 9:
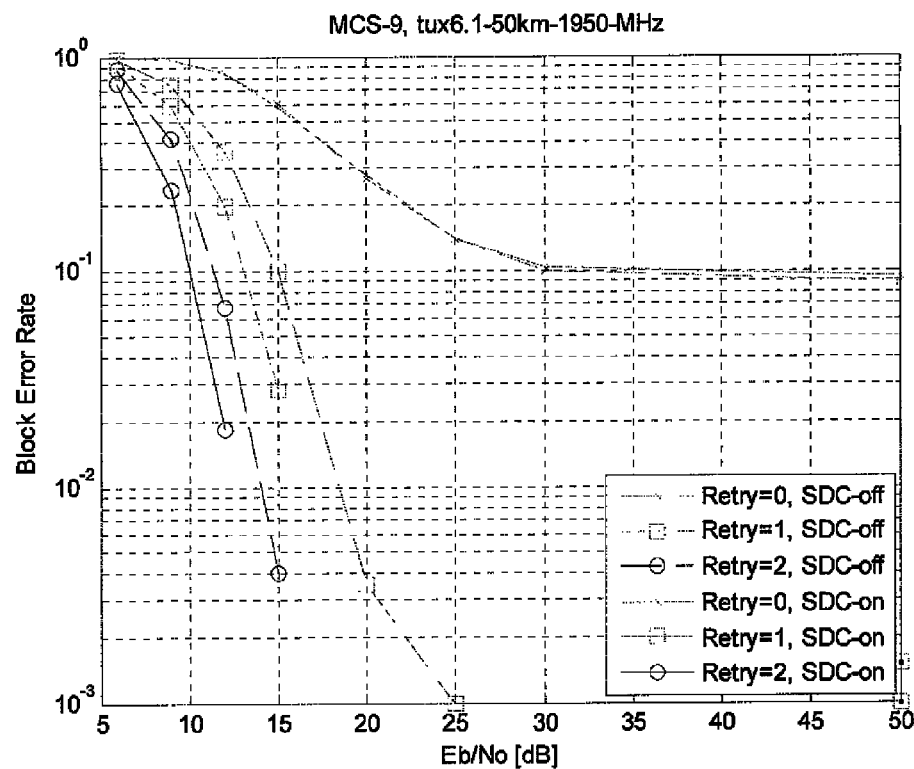
FIG. 9 is a graph comparing BLER for incremental retries.
Figure 10:
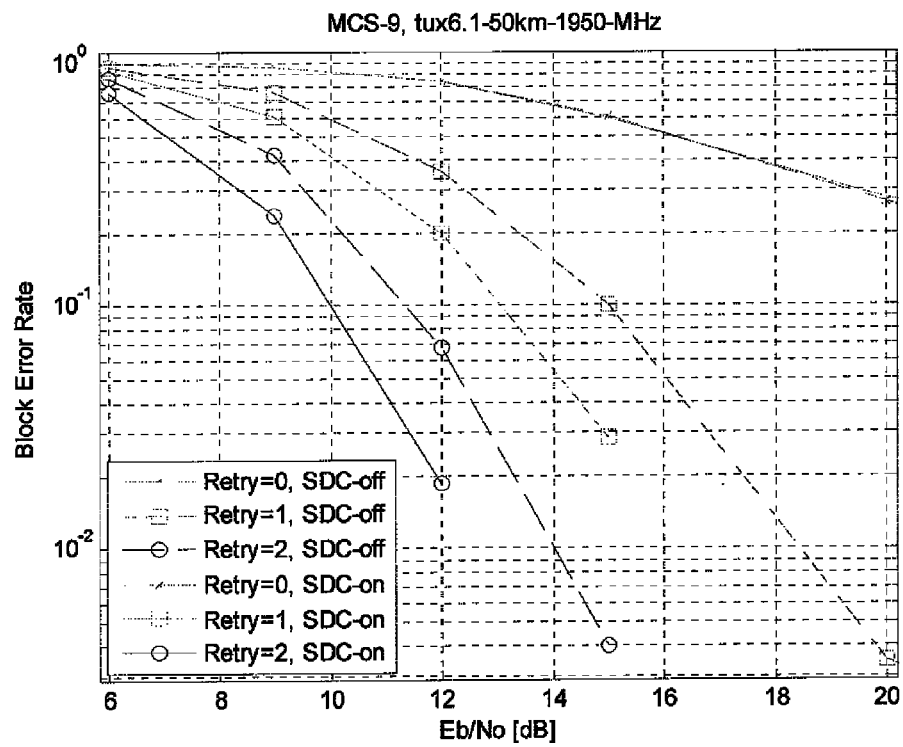
FIG. 10 is an enlarged portion of the graph of FIG. 9.

Referring to FIGS. 9 and 10, the performance of coding scheme MCS-9 in the incremental retries is shown. For a channel profile of TUX6.1-50 km-1950 MHz, the correction factor results in a gain of approximately 2 dB for one retry and a gain of approximately 1.5 dB for two retries at BLER=10⁻¹.

A specific embodiment has been shown and described herein. However, modifications and variations may occur to those skilled in the art. All such modifications and variations are believed to be within the sphere and scope of the present embodiment.

What is claimed is:

1. A soft decision correction circuit for a receiver having a channel equalizer for receiving a burst and generating a soft decision output associated with said burst and a decoder for receiving and decoding a block of bursts including said burst, the soft decision correction circuit being intermediate said channel equalizer and said decoder for calculating a correction factor based on said soft decision output and multiplying said soft decision output in said burst by said correction factor; wherein said correction factor is $$c = \frac{m_{|sd|}^2}{\sigma_{|sd|}^2},$$

where $m_{|sd|}^2$ is the square of the mean of the absolute value of the soft decision and $\sigma_{|sd|}^2$ is the variance of the absolute value of the soft decision.

2. The circuit of claim 1, further comprising demapping, de-interleaving and de-puncturing blocks provided between said channel equalizer and said decoder.

3. The circuit of claim 2, wherein said receiver is used in a mobile communication system comprising any of: Global Systems for Mobile Communications "GSM", Enhanced Data rates for GSM Evolution "EDGE" and General Packet Radio Service "GPRS".

4. The circuit of claim 2, wherein said channel equalizer is a Viterbi equalizer.

5. The circuit of claim 2, wherein said receiver supports incremental redundancy reception for requesting at least one retransmission of a failed data block including said burst with a different puncturing scheme.

6. The circuit of claim 1, wherein said decoder is a forward error correction decoder.

7. The circuit of claim 6, wherein said receiver is used in a mobile communication system comprising any of: Global Systems for Mobile Communications "GSM", Enhanced Data rates for GSM Evolution "EDGE" and General Packet Radio Service "GPRS".

8. The circuit of claim 6, wherein said channel equalizer is a Viterbi equalizer.

9. The circuit of claim 6, wherein said receiver supports incremental redundancy reception for requesting at least one retransmission of a failed data block including said burst with a different puncturing scheme.

10. The circuit of claim 1, wherein said receiver is used in a mobile communication system comprising any of: Global Systems for Mobile Communications "GSM", Enhanced Data rates for GSM Evolution "EDGE" and General Packet Radio Service "GPRS".

11. The circuit of claim 10, wherein said channel equalizer is a Viterbi equalizer.

12. The circuit of claim 10, wherein said receiver supports incremental redundancy reception for requesting at least one retransmission of a failed data block including said burst with a different puncturing scheme.

13. The circuit of claim 1, wherein said channel equalizer is a Viterbi equalizer.

14. The circuit of claim 13, wherein said receiver supports incremental redundancy reception for requesting at least one retransmission of a failed data block including said burst with a different puncturing scheme.

15. The circuit of any one of claim 1, wherein said receiver supports incremental redundancy reception for requesting at least one retransmission of a failed data block including said burst with a different puncturing scheme.

16. A soft decision correction method comprising:
receiving a burst and equalising it to thereby generate a soft decision output associated with said burst;
calculating a correction factor based on said soft decision output;

multiplying said soft decision output in said burst by said correction factor; and decoding a block of bursts including said burst having said correction factor applied; wherein said correction factor is $$c = \frac{m_{|sd|}^2}{\sigma_{|sd|}^2},$$

where $m_{|sd|}^2$ is the square of the mean of the absolute value of the soft decision and $\sigma_{|sd|}^2$ is the variance of the absolute value of the soft decision.

17. The method of claim 16, further comprising demapping, de-interleaving and de-puncturing provided prior to decoding said block of bursts.

18. The method of claim 17, further comprising requesting at least one retransmission of a failed data block including said burst with a different puncturing scheme.

* * * * *